Patented May 23, 1933

1,910,910

UNITED STATES PATENT OFFICE

RUDOLF WIETZEL, OF LUDWIGSHAFEN-ON-THE-RHINE, AND CONRAD PFAUNDLER, OF OPPAU, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF HYDROCARBONS OF THE BENZENE SERIES

No Drawing. Application filed November 6, 1926, Serial No. 146,844, and in Germany November 12, 1925.

When gaseous hydrocarbons of the ethylene series such as ethylene, propylene or butylene are subjected to a catalytic treatment at elevated temperatures, hydrocarbons of the benzene series can be obtained, but in this reaction a considerable portion of the olefines is converted into paraffines, in particular methane and ethane, so that the yield in hydrocarbons of the benzene series is rather low.

We have now found that gaseous olefines can be converted into hydrocarbons of the benzene series with very good yields by working in two stages. In the first stage the olefines, either alone or in mixture with other gases such as nitrogen, carbon monoxid, hydrogen or others, are converted under elevated pressure and at moderately elevated temperatures and with or without the aid of catalysts into polymerization products which are liquid under ordinary room conditions. In the second stage these liquid products are subjected to catalytic dehydrogenation with or without the aid of elevated pressures, preferably at a temperature higher than that employed in the first stage, whereby they are converted into hydrocarbons of the benzene series.

The first stage of the process may be carried out in any known or suitable manner, for example by passing the olefines under pressure and at elevated temperatures over catalysts, or by acting on olefines with warm sulfuric acid under pressure, or in any other suitable manner. When passing the olefines at elevated temperatures over catalysts, the temperature employed should preferably range between about 300° and 500° C.

In the second stage most various catalysts may be employed. Molybdenum, tungsten, copper, ferrosilicon, zinc oxid, molybdenum oxid, chromium oxid, thoria, cerium oxid, copper borate, active charcoal for example obtained from humus, active silica, aluminum borate and the like may be mentioned as examples. However, catalysts and materials for the apparatus which would give rise to the separation of carbon and the formation of methane, such for example as iron and nickel, should not be employed.

When carrying out the second stage under ordinary pressure, care should also be taken that the catalysts do not exert any substantial depolymerizing action, in order to avoid decomposition of the liquid products obtained in the first stage into low olefines. Also the second stage of the process according to our invention may be carried out in the presence of gases, for example ethylene or hydrogen. The temperature at which the second stage of the process is carried out should be at least 500° C.; generally a temperature of at least 550° C. will be employed.

The hydrogen-containing gases resulting from the dehydrogenation may be utilized for many purposes, for example for the hydrogenation or reduction of organic compounds such as the conversion of phenols to hydrocarbons of the benzene series. It is even possible to carry out such reactions simultaneously with the dehydrogenation for example by passing the polymerization products obtained in the first stage together with hydrogenizable organic compounds, for instance hydrogenizable hydrocarbons or hydrocarbon derivatives such as phenols, over catalysts.

The following examples will further illustrate how our invention may be carried out in practice, but the invention is not limited to these examples.

*Example 1*

Ethylene is passed at 400° C. under a pressure of 40 atmospheres over active charcoal. The bulk of the ethylene is converted into hydrocarbons which can easily be liquefied; the remaining gas is passed again over the contact mass after fresh ethylene has been added.

The liquid polymerization products which have a specific gravity of between 0.70 to 0.74 on an average, are passed over ammonium molybdate at 600° C. and under a pressure of 5 atmospheres, whereby the bulk of them is converted into benzene and homologues thereof. The separation of the liquid polymerization products may be dispensed with and the gas mixture obtained in the first stage subjected directly to dehydrogenation.

Example 2

A mixture of ethylene and its nearest homologues is subjected to a first stage treatment as described in Example 1. The polymerization products are mixed with 20 per cent of their weight of a mixture of phenols and passed at 650° C. under ordinary pressure over iron turnings coated with tin. By this treatment the bulk of the polymerization products and phenols is converted into hydrocarbons of the benzene series.

Example 3

Oil gas obtained by the pyrogenic decomposition of tar oils and containing about 40 per cent of gaseous olefines is passed over active silica under a pressure of 100 atmospheres and at about 400° C. A liquid hydrocarbon mixture consisting of olefines, paraffines and napthenes is obtained in a yield of about 90 per cent or even more, calculated on the consumed quantity of gaseous olefines. The mixture is passed in the vapor state together with hydrogen under a pressure of 200 atmospheres at about 600° C. over a catalyst containing about equal parts of molybdenum oxid and chromium oxid. By this treatment aromatic hydrocarbons, especially benzene are produced, in a yield of about 80 per cent calculated on the quantity of gaseous olefines consumed. The hydrogen is employed again in the second stage of the process or for any other purpose.

We claim:—

1. The process for the production of hydrocarbons of the benzene series, which comprises subjecting liquid hydrocarbons obtained by treatment of gaseous olefines under pressure and at a temperature of between about 300 and 500° C. to catalytic dehydrogenation at temperatures above 500° C.

2. The process for the production of hydrocarbons of the benzene series which comprises subjecting liquid hydrocarbons obtained by treatment of gaseous olefines under pressure and at a temperature of between about 300 and 500° C. to catalytic dehydrogenation under a pressure exceeding atmospheric pressure and a temperature of above 500° C.

3. The process for the production of hydrocarbons of the benzene series which comprises subjecting liquid hydrocarbons obtained by passing gaseous olefines over active charcoal under pressure and at a temperature of between about 300 and 500° C. to catalytic dehydrogenation at temperatures above 500° C.

4. The process for the production of hydrocarbons of the benzene series which comprises subjecting liquid hydrocarbons obtained by passing ethylene over active charcoal at a temperature of 400° C. and a pressure of about 40 atmospheres to dehydrogenation at a temperature of about 650° C. in the presence of a catalyst comprising iron coated with tin.

5. The process for the production of hydrocarbons of the benzene series which comprises subjecting a liquid comprising substantial amounts of hydrocarbons, obtained by passing gaseous olefines over a catalyst selected from the class consisting of active charcoal and active silica under pressure and at a temperature of between about 300 and 500° C. to catalytic dehydrogenation at temperatures above 500° C.

6. The process for the production of hydrocarbons of the benzene series which comprises subjecting a liquid comprising substantial amounts of hydrocarbons, obtained by passing ethylene over a catalyst selected from the class consisting of active charcoal and active silica under pressure and at a temperature of between about 300 and 500° C., to catalytic dehydrogenation at temperatures above 500° C.

7. The process for the production of hydrocarbons of the benzene series which comprises subjecting a liquid comprising substantial amounts of hydrocarbons, obtained by passing gaseous olefines over active silica under pressure and at a temperature of about 400° C., to dehydrogenation at a temperature of about 600° C., under a pressure of about 200 atmospheres in the presence of a catalyst containing an oxide selected from the class consisting of oxides of molybdenum and chromium.

8. A process as defined in claim 7, wherein the catalyst employed in the dehydrogenation comprises a mixture of the oxides of molybdenum and chromium.

9. The process for the production of hydrocarbons of the benzene series which comprises subjecting liquid hydrocarbons, obtained by the treatment of gaseous olefines under pressure at a temperature of between about 300 and 500° C. together with a phenol to catalytic dehydrogenation at a temperature above 500° C.

In testimony whereof we have hereunto set our hands.

RUDOLF WIETZEL.
CONRAD PFAUNDLER.